Dec. 23, 1952       H. W. CARDWELL ET AL       2,622,714
MULTIPLE CLUTCH DEVICE
Filed April 8, 1947                    4 Sheets-Sheet 1
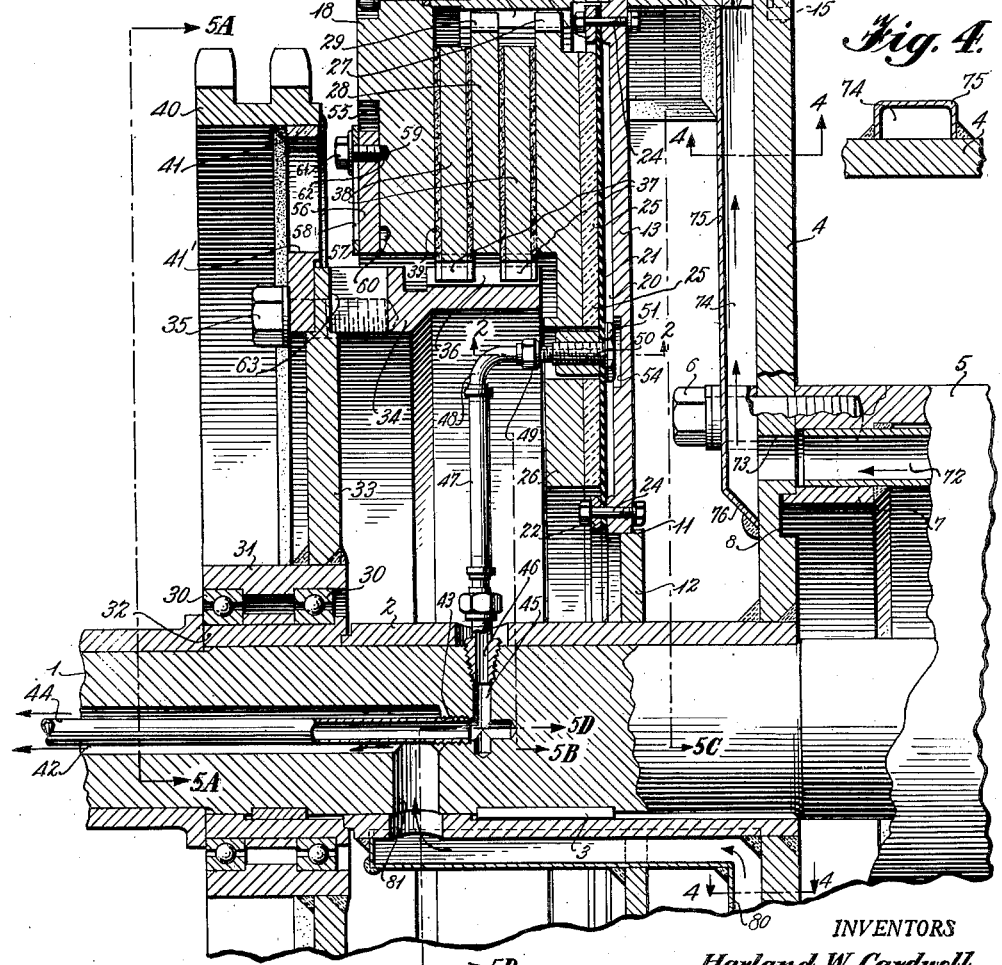
INVENTORS
Harland W. Cardwell
and Earl R. Johnson
By Barow & Thomas
ATTORNEYS

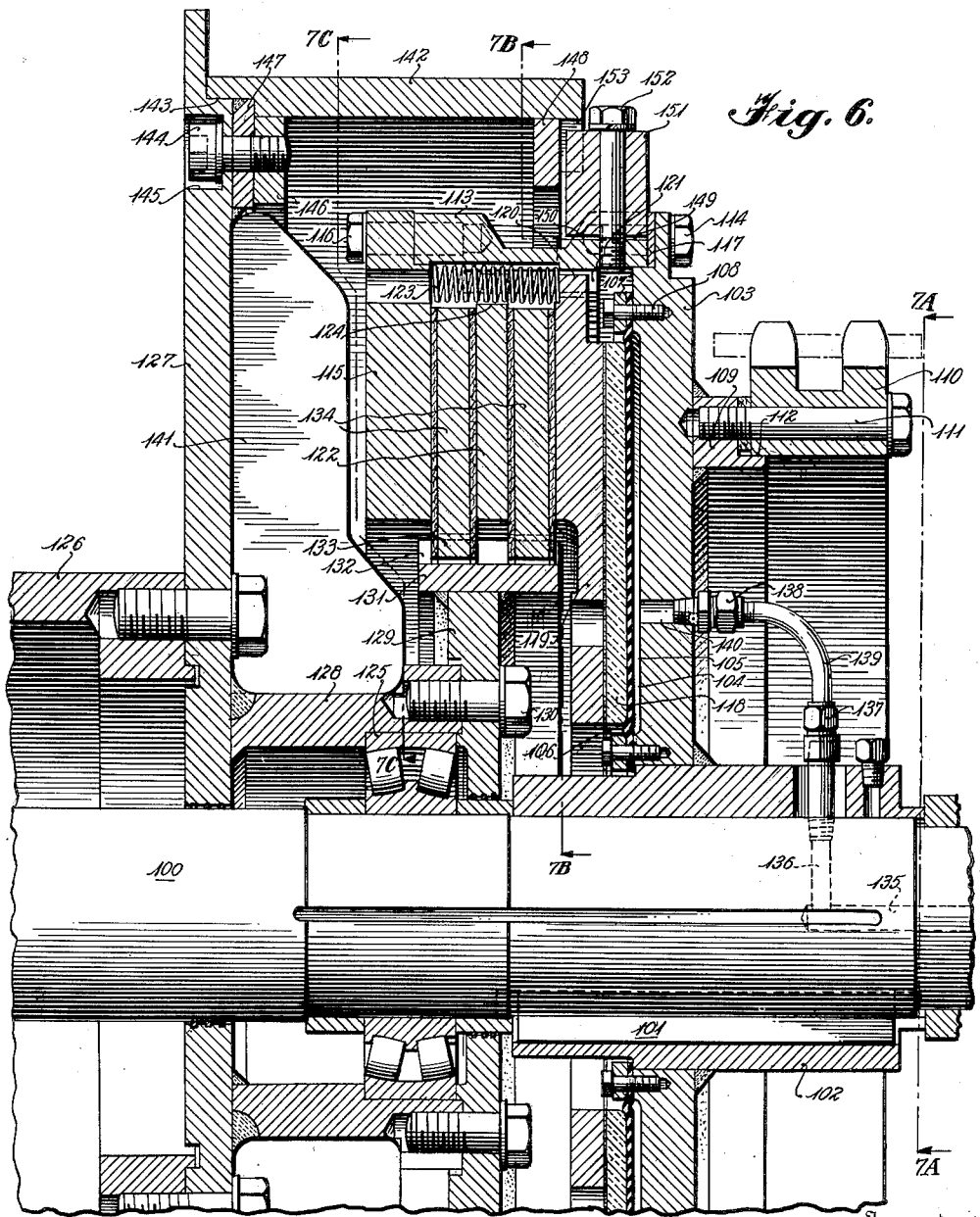

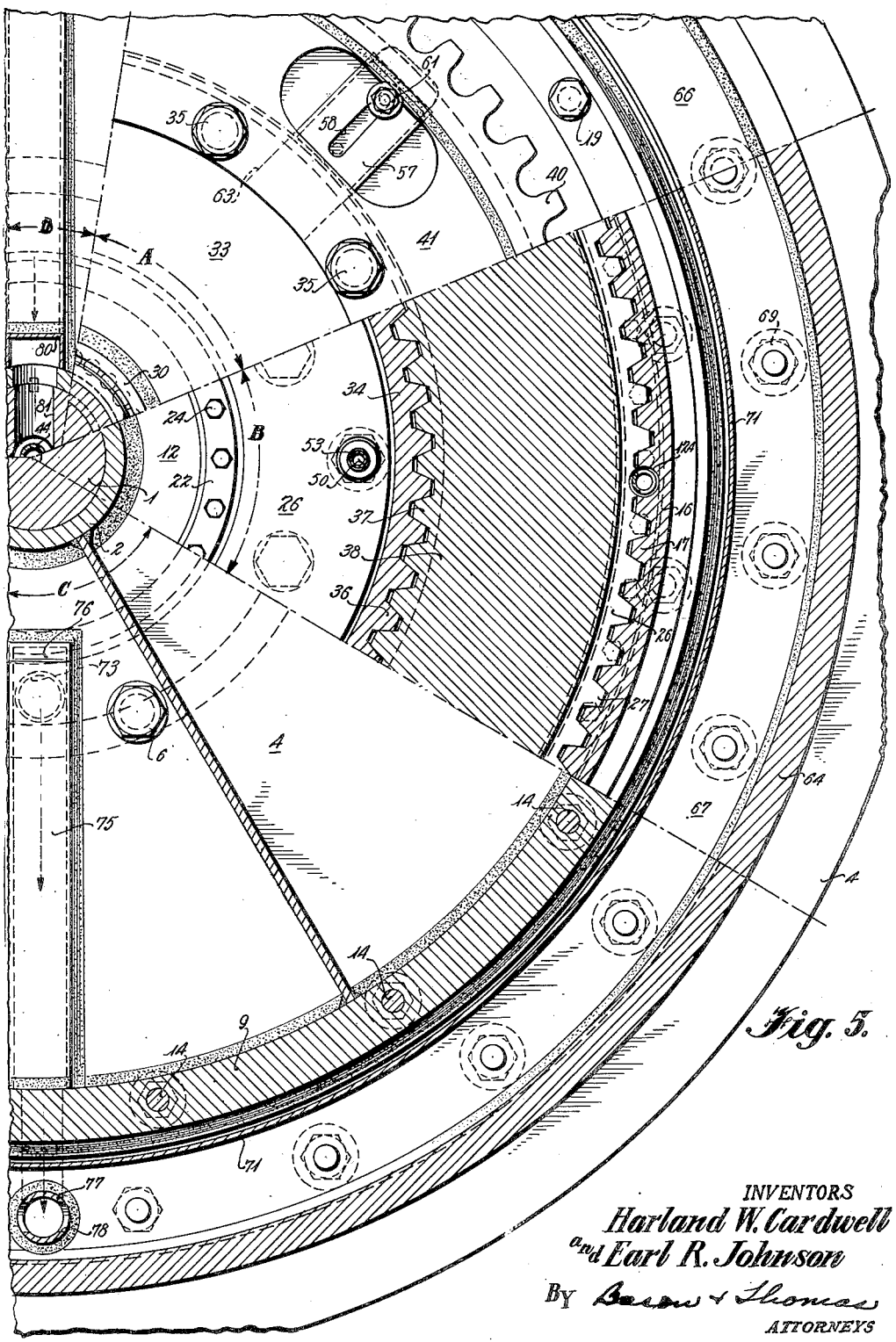

Patented Dec. 23, 1952

2,622,714

UNITED STATES PATENT OFFICE 2,622,714

MULTIPLE CLUTCH DEVICE

Harland W. Cardwell and Earl R. Johnson, Wichita, Kans., assignors to Cardwell Manufacturing Company, Inc., Wichita, Kans.

Application April 8, 1947, Serial No. 740,236

2 Claims. (Cl. 192—48)

This invention relates to clutches, and particularly to pneumatically operated friction clutches adapted to transmit heavy torques.

An object of this invention is to provide a clutch of this type that is efficient in operation and relatively trouble free during its useful life.

Another object of this invention is to provide a remotely controlled clutch having means to positively connect the driving and driven members in the event of failure of the remote control means whereby power may be transmitted to the driven member without the necessity of shutting down the driven machine.

A still further object of this invention is to provide a friction clutch in which provision is made for adjustment of the friction elements to compensate for wear thereof.

Further objects and advantages will become apparent as the description of the device proceeds.

In the drawings:

Figure 1 is a portion of a longitudinal sectional view of one form of clutch embodying the present invention;

Figure 2 is a sectional view taken on line 2—2 of Figure 1;

Figure 3 is a fragmentary sectional view taken on line 3—3 of Figure 2;

Figure 4 is a detailed sectional view taken on line 4—4 of Figure 1;

Figure 5 is a composite sectional view, the sectors identified as A, B, C and D being portions of sectional views taken on lines 5A—5A, 5B—5B, 5C—5C and 5D—5D, respectively, of Figure 1;

Figure 6 is a portion of a longitudinal sectional view of another embodiment of clutch according to the present invention.

Figure 7:
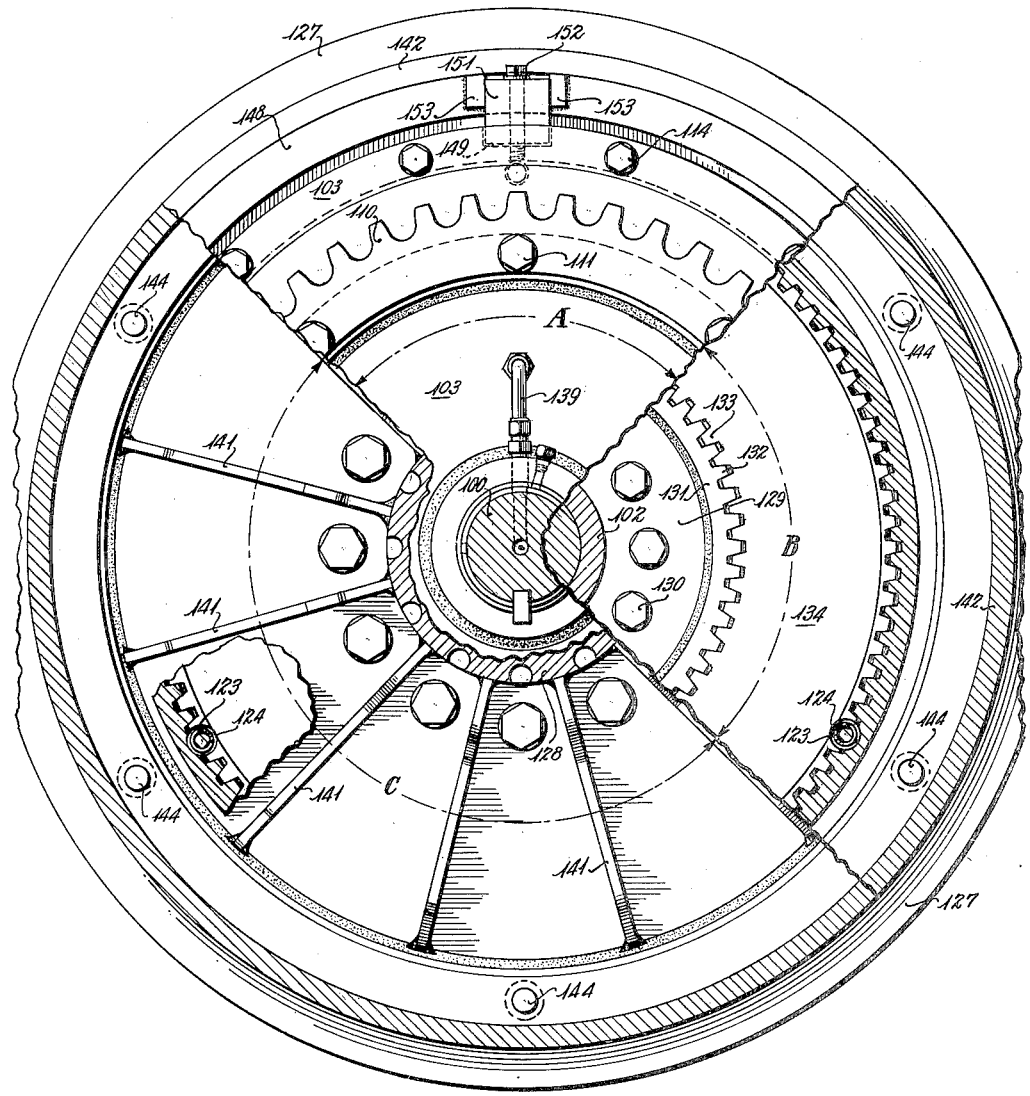
Figure 7 is a composite sectional view, the sectors identified as A, B, and C being portions of sectional views taken along lines 7A—7A, 7B—7B and 7C—7C, respectively, of Figure 6.

In the embodiment of Figures 1 to 5 a shaft 1 is supported for rotation in suitable bearings (not shown) on a stationary framework. A sleeve member 2 is keyed, as at 3, to the shaft 1 and has attached thereto, as by welding, a disc member 4. This disc member constitutes, in the illustrated embodiment, one end wall of a hoisting drum. It is to be understood, however, that the invention herein disclosed is not to be restricted to use with a hoisting drum, that such a drum is illustrated merely by way of example. Cylindrical member 5, concentric with the shaft 1, is attached to the disc 4 by cap screws 6 and is held in concentric relation to the shaft 1 by means of a ring element 7 attached thereto, as by welding, and having a portion extending into and engaging the outer side wall of an annular groove 8 formed in one face of the disc member 4.

A cylindrical member 9 is arranged concentric to the shaft 1 and in engagement with the outer face of a flange 68 attached to the disc member 4. Flange 68 is welded to the face of the disc member 4 to reinforce said disc member in the zone where it is weakened by the recesses 15 and 70, to be later described. The cylindrical member 9 is provided with a rabbet 10 near its outer end, the bottom of this rabbet being coplanar with the surface 11 of an annular rabbet in the outer periphery of a ring 12. The ring 12 is permanently attached to the sleeve 2 in any suitable manner, such for instance as by welding. An annular backing plate member 13 is arranged with its inner and outer peripheral portions resting in the rabbets described above and is held in place by cap screws 14 which have their heads lying in recesses 15 in the disc member 4 and extend through openings in the cylindrical member 9 and the backing plate 13 and are threadedly engaged with a second cylindrical member 16. The cylindrical member 16 is also concentric to the shaft 1 and constitutes, in effect, a continuation of the cylindrical member 9, and as will be obvious the cylindrical member 16 will act as a clamping member to hold the annular backing plate 13 in assembled relation to the cylindrical member 9. A series of circumferentially arranged inwardly extending tooth elements 17 are provided on the inner face of the cylindrical member 16.

An annular member 18 is held by cap screws 19 in assembled relation to the cylindrical member 16 and also extends about the shaft 1 concentric thereto. Spacing rings or washers 19' are provided for each of the cap screws 19 and are positioned between the pressure plate 18 and the end of the cylindrical member 16. These spacers 19' are provided so that upon the wearing away of the friction and pressure plates, to be later described, said spacers may be removed and the pressure plate 18 moved into direct engagement with the end of the cylindrical member 16 thus providing an adjustment to compensate for the wear of the friction and pressure plates.

The backing plate 13 is provided with an annular recess 20 therein, which recess likewise extends concentrically about the shaft 1. The annular recess 20 is covered by a flexible diaphragm 21, the diaphragm being clamped against the face of the backing plate 13 by means of inner and outer clamping rings 22 and 23, respectively, and bolts 24, thus forming with the recess a completely enclosed pressure chamber. The diaphragm may be constructed of any suitable flexible material impervious to air, such as rubber or the like, or it may be of a suitable heat resistant material. A plate 25, of heat insulating material, such for instance as "Masonite," is arranged in abutting relation to the outer surface of the diaphragm 21 and is of a radial extent somewhat less than the radial dimension of the recess 20. This insulating plate 25 is likewise annular in shape and extends concentrically about the shaft 1. The insulating plate 25 is cemented or otherwise attached to one face of an annular pressure plate 26. It is to be understood that the means of attachment may be any other suitable means, such for instance as by means of screws or the like. The annular pressure plate 26 has teeth 27 extending radially outwardly from its outer periphery and which teeth are complementary to and engaged with the tooth elements 17 on the cylindrical member 16. The dimensions of the parts are such that the interengaging teeth 17 and 27 allow the backing plate 26 to freely slide therealong axially of the shaft 1 and yet prevent any appreciable radial movement or rotation of the pressure plate 26 relative to the cylindrical member 16. An intermediate pressure plate 28 has radially outwardly extending teeth 29 about its outer periphery which teeth likewise interengage with the teeth 17 in the same manner as described with reference to the teeth 27 on the backing plate 26. It is to be noted that the intermediate pressure plate 28 is likewise annular in shape and concentric to the shaft 1 but can be of greater internal radial dimension than the pressure plate 26.

A pair of antifriction bearings 30 support a hub member 31 for free rotation on the shaft 1 through the intermediary of a sleeve 32 on said shaft. The hub member 31 has attached thereto, as by welding, a flange member 33. A driving ring 34, of generally cylindrical shape and concentric to the shaft 1, is attached to the outer portion of the flange 33 by means of a plurality of cap screws 35 extending through said flange and threadedly engaged with said driving ring. The driving ring 34 has a circumferential series of tooth elements 36 extending outwardly from its outer periphery and interengaging with complementary tooth elements 37 on the inner periphery of a pair of similar friction plates 38. As shown in Figure 1, one of said friction plates extends outwardly between the intermediate pressure plate 28 and the pressure plate 18, and the other extends outwardly between the intermediate pressure plate 28 and the first pressure plate 26. Each of these friction plates 38 is annular in shape and their inwardly extending teeth 37 act to support the plates for axial sliding movement along the driving ring 34 but prevent relative rotation between the plates and said driving ring about the axis of the shaft 1. Each of the friction plates is provided on its opposite faces with a friction facing 39. Said friction facings may be of any suitable material and are for the purpose of increasing the coefficient of friction between the pressure plates and the friction plates to insure a positive drive when the parts are in driving engagement with each other. A driving sprocket wheel 40 has attached thereto an inwardly extending flange 41, as by welding, which flange extends inwardly sufficiently to overlap the outer portion of the flange 33 carried by the hub member 31. The flanges 41 and 33 have rabbets at their inner and outer edges, respectively, which interengage to insure the proper concentric alignment of the sprocket wheel 40 about the shaft 1 and the inner portion of the flange 41 is positioned between the heads of the cap screws 35 and the flange 33 whereby the cap screws 35 not only hold the driving ring 34 in assembled relation to the flange 33 but also hold the flange 41 and the sprocket wheel 40 in assembled relation thereto to form a single rigid structure.

The shaft 1 is provided with an axial bore 42 extending inwardly from one end thereof and terminating in a reduced internally threaded portion 43. A tube 44 of a lesser external diameter than the diameter of the bore 42 extends axially of said bore and is threadedly engaged with the reduced threaded portion 43 of the bore, as clearly shown in Figure 1 of the drawings. A lateral passage 45 extends radially of the shaft and has a standard fitting 46 at its outer terminus, which fitting is connected to a flexible conduit 47 which in turn is connected to an elbow 48. The elbow 48 is in turn connected by a standard fitting 49 to the hollow stem of a fitting 50. The fitting 50 extends through aligned openings in the pressure plate 26, the insulating plate 25 and the flexible diaphragm 21 and has a head 51 engaging a suitable washer 52, of heat insulating material, arranged against the inner face of the flexible diaphragm 21. The hollow stem of the fitting 50 is provided with external threads which threads are engaged by a nut element 53 which bears against the outer face of the flexible diaphragm 21 to clamp the fitting 50 with an airtight seal against the said diaphragm. The nut element 53 may be made of a heat insulating material to further protect the diaphragm 21 from the effects of frictionally generated heat that might be radiated from the pressure plates 26 to the fitting 50. It is also to be noted that the nut element 53 is of lesser external diameter than the openings of the plates 25 and 26 through which it extends, thus providing a gap therebetween to prevent conduction of frictionally generated heat from the pressure plate 26 to the fitting 50. The backing plate 13 is provided with a recess 54 which recess is directly opposite the head 51 of the fitting 50 and provides a clearance space for said head whereby the diaphragm and head 51 may move, to a limited extent, in a direct parallel to the axis of the shaft 1. During such movement, it is to be noted, the flexible conduit 47 may flex to allow such movement to occur freely since the fitting 46 is fixed on the shaft and can not move axially thereof during such movements of the fitting 50.

A series of circumferentially arranged compression springs 123 is arranged within notches 124 (see Figure 6, not shown in Figure 1) cut from the tooth portions of the plate 28 and the cylindrical member 16 and these springs bear, at opposite ends on the pressure plates 18 and 26, thus tending to urge said plates apart to disengage the clutch elements.

A source of compressed air (not shown) is connected, by suitable means, to the outer end of the tube 44 and suitable control means (not shown) are provided to admit compressed air from said source into the tube 44. Upon admission of compressed air to the tube 44, the air under pressure will be conducted through the tube and conduits described into the expansible pressure chamber 20, thus forcing the flexible diaphragm 21 outwardly (to the left as seen in Figure 1) and pressure will be transmitted through the insulating plate 25 to the first pressure plate 26. Since the pressure plates 26 and 28 are free to move to the left, as are friction plates 38, the plates 26, 28 and 38 will be moved into frictional engagement with each other and as a group will be further moved into frictional engagement with the pressure plate 18 and, since the pressure plate 18 is not free to move axially of the shaft 1, the pressure within the chamber 20 will act to clamp the pressure plates and friction plates together to thus form a driving connection between the sprocket wheel and driving ring assembly and the disc member 4 of the hoisting drum. It is to be noted that the movement imparted to the pressure plate 26 by the diaphragm 21 is within a fixed range and of rather limited extent. It is for this reason that the adjustment of the pressure plate 18, by removal of the spacers 19', is provided.

Although compressed air has been directed as the fluid for the clutch, it is to be understood that the invention is not limited to the use of compressed air, since any suitable pressure-transmitting fluid medium could be employed satisfactorily. Also, although the clutch has been described as having 3 pressure plates and 2 friction plates therebetween, it is to be understood that the invention is not limited to that specific number of plates but might satisfactorily be embodied in a clutch having a greater or lesser number of pressure and friction plates.

Means are further provided in this embodiment of our clutch whereby driving of the driven member may be effected even though there is a failure or loss of the motivating fluid, such that pressure is not available to expand the pressure chamber 20 and urge the driving and driven plates into engagement with each other. The backing plate 18 has a recess 55 in its outer face which recess extends radially inwardly through the inner periphery of said plate. A block 56, complementary in shape to the recess, is located in said recess for radial sliding movement therein. A cover plate 57 overlies the recess and is attached to the outer face of the pressure plate 18 in any suitable manner. The cover plate 57 is provided with a radial slot 58 and acts to hold the sliding block 56 in said recess. The recess 55 in the pressure plate 18 is further provided with openings 59 and 60 in the bottom surface thereof and a screw member 61 threadedly engages an opening in the sliding block 56 and has a shank extending through the slot 58 in the cover plate 57 and its head bears against the outer face of said cover plate. The dimensions of the slot 58 and the head of the screw 61 are such that the head will completely span the slot and engage the outer surface of the cover plate 57 on both sides of said slot. The screw 61 is further provided with a reduced end portion 62 of a size to be received in the openings 59 and 60. The driving ring 34 is provided with an opening 63 extending radially therethrough and so positioned axially thereof that it may be brought to lie in radial alignment with the recess 55 and slide block 56. Upon failure or loss of the motivating fluid for the clutch, the sprocket wheel and driving ring assembly may be rotated to a position where the opening 63 is opposite the recess 55 and upon loosening screw 61 to withdraw its reduced end 62 from the opening 59 the block 56 may be moved radially to extend into the opening 63 in the driving ring. Said block would be moved inwardly to align the reduced end portion of the screw 61 with the second opening 60 and upon advancing screw 61 through the block 56 the reduced end portion 62 will be advanced into opening 60 and the block 56 will thus be locked in driving position. It is to be understood that the circumferential dimension of the opening 63 is substantially equal to the transverse dimension of the block 56, whereby the block 56 may easily enter the said opening and act as a driving key therein without undue play, to effect driving engagement between the driving ring 34 and the driven portions of the clutch mechanism. Thus, it will be seen that upon the occurrence of a situation where the entire machine would otherwise have to be shut down, the emergency driving means just described enables the machine to be continued in operation until such time as the supply of motivating fluid is restored. As shown in Figure 1 the flange member 41 of the sprocket wheel 40 is provided with an opening 41' therethrough. Upon the event of failure of the motivating fluid the sprocket wheel 40 and flange 41 may be rotated to a position where the opening 41' is opposite the block 56 whereby to provide for access to the block 56 and its associated parts to enable the operator to bring the emergency drive means into operation.

Attention is called to the heat insulating plate 25, previously described. In a clutch of this type, considerable heat is generated between the pressure plates and the friction plates during engaging and disengaging movements thereof, which heat would have a deleterious effect on the flexible diaphragm 21 if it were allowed to reach said diaphragm. However, the insulating plate 25 prevents conduction of the frictionally generated heat from the pressure plate 26 to the said diaphragm, thus preventing destruction thereof by said heat and prolonging the efficient and useful life of the clutch.

The disc member 4 of the hoisting drum shown is further provided with a cylindrical member 64 arranged concentrically to the shaft 1 by means of a shoulder 65 on the disc 4 and provided with inwardly extending flange members 66, 67 and 68'. Cap screws 69, having their heads located in recesses 70 in the disc 4, extending through said disc into threaded engagement with the flange 68, thus holding the cylindrical member 64 and its attached flanges in assembled relation to the disc 4. The flanges 66, 67 and 68' are annular in shape and of the same radial dimensions and have a closure cylinder 71 attached, as by welding, to their inner peripheries, thus forming, between the cylindrical member 64 and the closure 71, an enclosed space for a purpose to be later described. It is to be noted that the flange 67 divides this enclosed space into two annular chambers. A source of coolant fluid (not shown) is connected to the conduit 72 running through the drum member 5 and provides a supply of coolant medium thereto. The conduit 72 is in communication, through opening 73 in the disc member 4, with a radially extending passageway 74. The passageway 74 is provided by a channel-shaped member 75 welded or otherwise secured to the inner face of the disc member 4 and having a closed end 76 lying slightly radially inwardly of the opening 73. The channel-shaped member 75 extends outwardly into abutting relation with the inner periphery of the flange 68, through which flange a passageway 76 extends into communication with the interior of a short tubular member 77 extending from the flange 68' to the flange 67. The short tubular member 77 is attached, as by welding, at its ends to flanges 67 and 68' and is provided with lateral openings 78 through its side walls. An opening 79 through the flange 67 provides communication between the inside of the short tubular member 77 and the outer annular coolant chamber. Diametrically opposite the short tubular member 77 an identical construction is provided (not shown) and it provides an exit passageway for a coolant fluid to a radially inwardly extending passageway 80, said passageway 80 being of the same construction as the passageway 74 but extending inwardly to the surface of the sleeve 2 and thence axially along said sleeve to a location adjacent a radial bore 81 extending through the sleeve 2 and into the shaft 1 into communication with the axial bore 42 previously described.

The cylindrical member 64 is provided primarily as an auxiliary brake drum, whereby a suitable brake shoe (not shown) may be brought into engagement therewith to control certain movements of the hoisting drum 5 in a well-known manner. During operation of the brake, considerable heat is generated and to prevent undue heating of the parts and also to prevent transmission of said heat to the flexible diaphragm 21, previously described, the coolant passageways, just described, are provided. In use, coolant fluid will enter through conduit 72, thence outwardly along passageway 74 and into the interior of the short tubular member 77. The openings 78 and 79 are so dimensioned that a substantially equal volume of coolant fluid will enter each of the coolant chambers described. The coolant fluid then passes circumferentially through the chambers to a point diametrically opposite the tubular member 77, whence it leaves the annular chambers and travels radially inwardly along passageway 80 and enters the bore 42 of the shaft 1. It is then conducted along said bore, exteriorly of the compressed air conduit 44 to the end of the shaft where it is discharged. It will be seen that the structure described provides for a continuous flow of coolant fluid through the brake means even during rotation of the hoisting drum 5. The coolant circulating through the above-described system is effective not only to convey away heat generated during brake operation but is also effective to convey away heat generated in the friction clutch mechanism which heat might be otherwise conducted through a circuitous path to the backing plate 13 and then to the flexible diaphragm 21 where it would have the deleterious effects referred to previously. The brake drum and means for circulating coolant fluid therein, as just described, constitutes the subject matter of our copending application Serial No. 716,916, filed December 18, 1946, now Patent No. 2,517,973, issued August 8, 1950.

In Figures 6 and 7 there is illustrated an embodiment of a modification of the clutch of our invention in which a different relationship between the driving and driven members is incorporated to make possible the use of the supporting shaft as a counter-shaft through which the driving member may operate additional mechanisms without driving the driven member. In this embodiment, a shaft 100 has affixed thereto, as by a key 101, a hub member 102. Attached to said hub member 102, as by welding, is an annular flange member 103 extending concentrically about the said hub and having in one face thereof an annular recess 104 covered by a flexible but air-impervious diaphragm 105 similar to that described in connection with Figures 1 to 5. The flexible diaphragm is clamped to the face of the flange 103 by means of inner and outer clamping rings 106 and 107, respectively. Said clamping rings are attached to the flange 103 by means of stud bolts 108, thereby providing an air-tight expansion chamber within said recess. A supporting ring 109 is attached to the face of the flange 103 opposite that having the recess 104 and said supporting ring carries a sprocket wheel 110 attached thereby by means of bolts 111. Said sprocket wheel is positioned, by a shoulder 112, on the said supporting ring concentric to the axis of the shaft 100. The sprocket wheel 110 is to be driven by any suitable power source (not shown) and, as is obvious, will drive the flange 103, the sleeve 102 and the shaft 100 in rotation.

A cylindrical member 113 is attached by means of bolts 114 to the outer portion of the flange 103 and carries at its opposite end a pressure plate 115 attached thereto by means of screws 116. A ring or washer member 117 on each of the screws 114 is arranged between the flange member 103 and the end of the cylindrical member 113, whereby to provide for adjustment of the pressure plate 115 toward the flange 103 when the clutch parts have become worn. Such adjustment is effected by removing the rings 117 and drawing the end of the cylindrical member 113 into contact with the flange member 103.

A heat insulating plate 118 is attached to one face of a pressure plate 119 by cement or any other suitable means and bears against the outer face of the flexible diaphragm 105. The pressure plate 119 is annular in shape and concentric to the shaft 100 and has radially outwardly extending teeth 120 complementary to and interengaging with teeth 121 extending inwardly from the inner surface of the cylindrical member 113. A second pressure plate 122 likewise is annular in shape and has outwardly extending teeth engaging the teeth 121. The structure comprising the diaphragm 105, the insulating plate 118, the pressure plates 119, 122, and 115, and the teeth 120 and 121 is substantially the same as that described in connection with Figures 1 to 5 and operates in identically the same manner, thus a more detailed description of these elements is considered unnecessary. A series of circumferentially arranged compression springs 123 is arranged within notches 124 cut from the tooth portion of the pressure plate 122 and the springs each bear, at opposite ends, on the pressure plates 115 and 119, thus tending to urge said plates apart to disengage the clutch elements.

An antifriction bearing 125, mounted on the shaft 100 supports a hoisting drum comprising cylinder 126, disc 127 and cylindrical extension 128 for rotation relative to the shaft 100 and about the axis thereof. Although we have illustrated a hoisting drum as being the driven element, it is to be understood that such a drum is shown merely as an example and that any other device could be driven with equal facility. A supporting ring 129 is attached by means of bolts 130 to the outer end portion of the cylindrical extension 128 and is attached at its outer periphery, as by welding, to a driven ring 131. Said driven ring 131 is concentric to the shaft 100 and has outwardly extending teeth 132 on its outer periphery, said teeth being engaged by complementary teeth 133 at the inner peripheries of a pair of annular friction plates 134. The construction of the friction plates 134 and their engagement with the driven ring 131 is the same as that described in connection with the embodiment of Figures 1 to 5 and further more detailed description thereof is considered unnecessary.

An axial bore 135 in the shaft 100 communicates with a transverse passage 136 and through fittings 137 and 138 and conduit 139 conducts air under pressure into opening 140 in the flange 103 and thence to the expansible pressure chamber 104. A suitable fitting (not shown) is provided at the opposite end of the bore 135, whereby air under pressure can be supplied to said bore during rotation of the shaft 100. Upon admission of compressed air to the bore 135 by suitable control means (not shown) the pressure within the expansible chamber 104 will cause movement of the diaphragm and pressure plate 119 to the left, as seen in Figure 6, to engage the parts of the clutch in the same manner as described with reference to Figures 1 to 5 and effect a driving engagement between the sprocket wheel 110 and the hoisting drum 126. The clutch embodiment just described could be used where it is desired that the shaft rotate independently of the drum, such as would be the case if another drive were wished to be taken off this shaft to an additional shaft construction (not shown). In the embodiment illustrated in Figures 1 to 5 it is to be noted that the hoisting drum is keyed to the shaft 1 and that the shaft 1 is rotated by the sprocket wheel 40 only when the clutch is engaged and the hoisting drum is rotated.

The structure shown in Figure 6 also includes a plurality of radially extending ribs 141 which are attached in any suitable manner, such as by welding, to the disc member 127 and to the cylindrical extension 128. These ribs are provided to reinforce the disc 127 which tends to distort under the lateral thrust of a cable being wound on the drum 126.

A cylindical drum member 142 is positioned by shoulders 143 on the disc 127 concentric to the shaft 100 and is held in assembled relation to the disc 127 by means of screws 144, having their heads lying in recesses 145 in the disc 127 and threadedly engaged with a flange 146, welded or otherwise attached to the cylindrical drum member 142. A ring member 147 is welded to the face of the disc 127 to provide additional strength where said disc is recessed for reception of the heads of screws 144. A second flange 148 is attached, by welding or otherwise, to the inner periphery of the drum 142 and is located adjacent the outer end of said drum.

The flange member 103 and the cylindrical member 113 are provided with outwardly facing notches 149 and 150, respectively, said notches being aligned with each other to provide in effect a single outwardly facing notch in the driving assembly. A block 151 can be placed in said notch and held therein by means of such a cap screw as shown at 152. A pair of lugs 153 are welded, or otherwise rigidly attached, to the drum member 142 and its flange 148 in positions to engage opposite edge faces of the block 151, thus providing a positive drive from the sprocket wheel 110 to the drum 126 in the event of failure or loss of the compressed air supply for actuating the clutch. During normal operation, of course, the block 151 and its screw 152 would be removed and would be employed only in the case of the emergency referred to, to enable the hoisting drum to be operated even during such a failure of the supply of compressed air.

The cylindrical drum member 142 may, if desired, be used as a brake drum to further control the operation of the hoisting drum 126.

It is to be noted that the insulating plate 118 performs the same function in this embodiment as the insulating plate 25 does in the embodiment of Figures 1 to 5.

Although a specific detailed structure has been shown and described, it is to be understood that we do not wish to be limited to those specific features, but contemplate that our invention include other embodiments as may fall within the scope of the appended claims.

We claim:

1. In a clutch having a driving member and a driven member with engageable means on said members to effect a driving connection therebetween and control means for said engageable means; additional means received in a recess formed in a radial face of one of said members and movable radially toward said other member from a retracted to an advanced position to engage said other member to effect a driving connection between said members independent of the driving connection effected by said first-named engageable means; radially slotted means retaining said additional means in said recess; and a fastening element connected with said additional means and extending through said slotted means, said fastening element being operable to serve the dual purpose of shifting said additional means to either its advanced or retracted position and locking said additional means in the selected position.

2. In a clutch, a rotatable supporting shaft having a driven member rigidly mounted thereon, a driving member rotatably mounted on said shaft, engageable means on said members to effect a driving connection between said members, and control means for said engageable means, additional means on one of said members and radially movable toward said other member from a retracted to an advanced position to engage said other member to effect a driving connection between said members independent of the driving connection effected by said first-named engageable means in the event of failure of said control means, said one member having radially spaced depressions therein confronting said additional means and located in positions corresponding to the advanced and retracted positions of said additional means; and means including an element disposed in an opening in said additional means and selectively projectable into either of said depressions for locking said additional means in either its advanced or retracted position.

HARLAND W. CARDWELL.
EARL R. JOHNSON.

REFERENCES CITED

The following references are of record in the file of this patent:

UNITED STATES PATENTS

| Number | Name | Date |
| --- | --- | --- |
| 1,690,543 | Linderman | Nov. 6, 1928 |
| 2,005,468 | Modine | June 18, 1935 |
| 2,060,562 | Fausset | Nov. 10, 1936 |
| 2,082,129 | Van Ranst | June 1, 1937 |
| 2,108,165 | Criley | Feb. 15, 1938 |
| 2,190,874 | Jarrett | Feb. 20, 1940 |
| 2,304,350 | Gillett | Dec. 8, 1942 |
| 2,370,360 | McLean et al. | Feb. 27, 1945 |
| 2,386,478 | Kraft | Oct. 9, 1945 |
| 2,409,013 | Bodmer | Oct. 8, 1946 |
| 2,462,944 | Cardwell et al. | Mar. 1, 1949 |